No. 742,955. PATENTED NOV. 3, 1903.
C. D. AUGUR.
COOKING UTENSIL.
APPLICATION FILED DEC. 23, 1902.
NO MODEL.
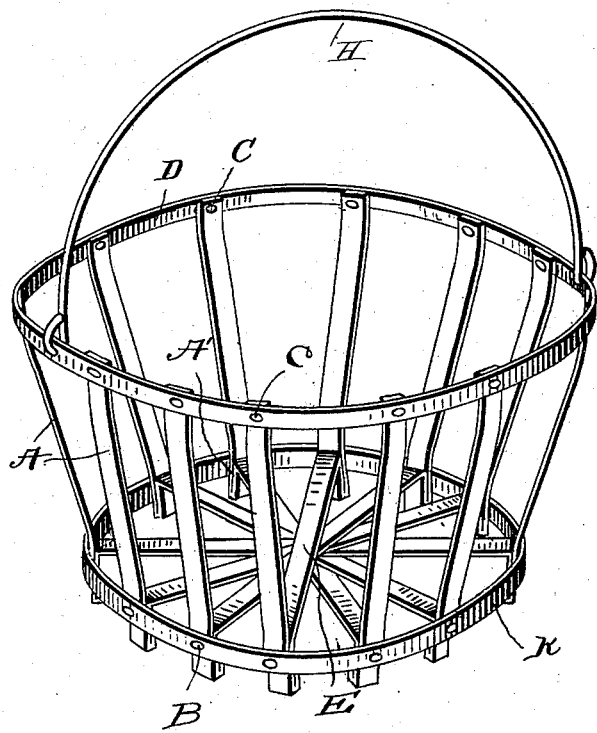

No. 742,955. Patented November 3, 1903.

UNITED STATES PATENT OFFICE.

CHARLES D. AUGUR, OF ALBERT LEA, MINNESOTA.

COOKING UTENSIL.

SPECIFICATION forming part of Letters Patent No. 742,955, dated November 3, 1903.

Application filed December 23, 1902. Serial No. 136,390. (No model.)

*To all whom it may concern:*

Be it known that I, CHARLES D. AUGUR, a citizen of the United States, residing at Albert Lea, in the county of Freeborn and State of Minnesota, have invented certain new and useful Improvements in Cooking Utensils; and I do hereby declare the following to be a full, clear, and exact description of the invention, such as will enable others skilled in the art to which it appertains to make and use the same.

This invention relates to new and useful improvements in cooking utensils, and especially in the provision of a metallic basket or receptacle adapted to contain vegetables or other articles and provided for the purpose of allowing the same to be placed in a kettle or other receptacle for boiling or steaming; and it consists more particularly in a skeleton-frame basket made up of strips of metal and having the opposite vertical ribs of the basket made of single pieces of metal which are bent upon themselves to form feet, whereby the bottom of the basket may be positioned a slight distance above the lower ends of the feet to bring the contents or articles contained in the basket above the bottom of the kettle in which the basket is adapted to rest.

The invention consists, further, in various details of construction and in combinations and arrangements of parts, which will be hereinafter more fully described and then specifically defined in the appended claim.

My invention is clearly illustrated in the following drawing, in which I have shown a perspective view of my improved metallic cooking utensil.

Reference now being had to the details of the drawing by letter, A A designate a series of metallic strips, which may be of galvanized iron or other material which may be found to be best adapted for the purpose, and each strip is bent upon itself at A', and the two portions thus bent upon themselves are secured together by rivets B. These portions of the strips which are thus bent are adapted to form feet, on which the basket rests. Each strip has an upwardly-projecting portion forming a rib to the basket, which is secured at C to a band D, and the portions of each strip intermediate the portions which are bent upon themselves are horizontally disposed and superimposed one above the other and intersect each other at E, thus distributing equally the weight of any articles that may be placed in the receptacle upon the various strips. A band K surrounds the lower portion of the receptacle and is riveted or otherwise securely held to the portions of the strips which are bent upon themselves, thus holding the same securely in place, and to the upper band D is fastened a bail H.

From the foregoing it will be observed that by the provision of a receptacle made in accordance with my invention articles contained therein may be held a slight distance above the bottom of the kettle in which the receptacle or basket is placed, preventing the contents of the basket coming in contact with the bottom of a kettle, and the basket may be readily placed in or removed from the kettle.

While I have described my invention as being made of strips of metal, if preferred wire, either twisted or plain, or any other material may be used if found to be well adapted for the purpose, and I may make detailed changes, if desired, in the construction of the device without departing from the spirit of the invention.

Having thus fully described my invention, what I claim as new, and desire to secure by Letters Patent, is—

A skeleton basket made up of a series of flat metallic strips, each of which is bent upon itself at two locations, forming oppositely-disposed feet, the strips intermediate said bent portions intersecting each other and resting in contact with one another, a band surrounding the lower portion of the basket, and a rivet passing through said band, and holding the portions which are bent upon themselves together, and a band connecting the upper ends of the strips forming the rim of the basket, and a bail secured to said rim, as set forth.

In testimony whereof I affix my signature in presence of two witnesses.

CHARLES D. AUGUR.

Witnesses:
J. A. ASTBY,
A. C. ERICKSON.